[54] AUTOMATIC GAIN COMPENSATION IN TIME DIVISION SWITCHING SYSTEM

[75] Inventor: James Richard Stidham, Broomfield, Colo.

[73] Assignee: Bell Telephone Laboratories, Incorporated, Murray Hill, N.J.

[22] Filed: Dec. 23, 1974

[21] Appl. No.: 535,487

[52] U.S. Cl.............................. 179/15 AT; 179/15 BL
[51] Int. Cl.² ............................................ H04J 3/02
[58] Field of Search ........ 179/15 A, 15 AA, 15 AT, 179/15 BL

[56] References Cited
UNITED STATES PATENTS
3,761,624  9/1973  Lewis et al...................... 179/15 AA Primary Examiner—Kathleen H. Claffy
Assistant Examiner—E. S. Kemeny
Attorney, Agent, or Firm—H. R. Popper

[57] ABSTRACT

Port circuits in a time division switching system that have their outputs connected to a common summing bus by respective summing resistors have their output signals attenuated when the conversation is among port circuits on the same bus: the simultaneous closure of the respective time slot switches causes the summing resistor of one port to shunt the output from the other port. However, when the connection involves port circuits served by different summing buses, there is usually sufficient isolation between the buses to mask the shunting effect. The present disclosure shows an arrangement for selectively adding a compensating amplifier and an attenuating resistor to each distribution bus. When the call involves port circuits served by the same summing and distribution bus pair the amplifier completely compensates for all attenuation. When the call involves ports served by a different summing and distribution bus pair, there is no input shunting to reduce gain but now a pair of compensating amplifiers are involved and their input attenuating resistors are in shunt to ground reducing the gain to the normal level.

8 Claims, 1 Drawing Figure

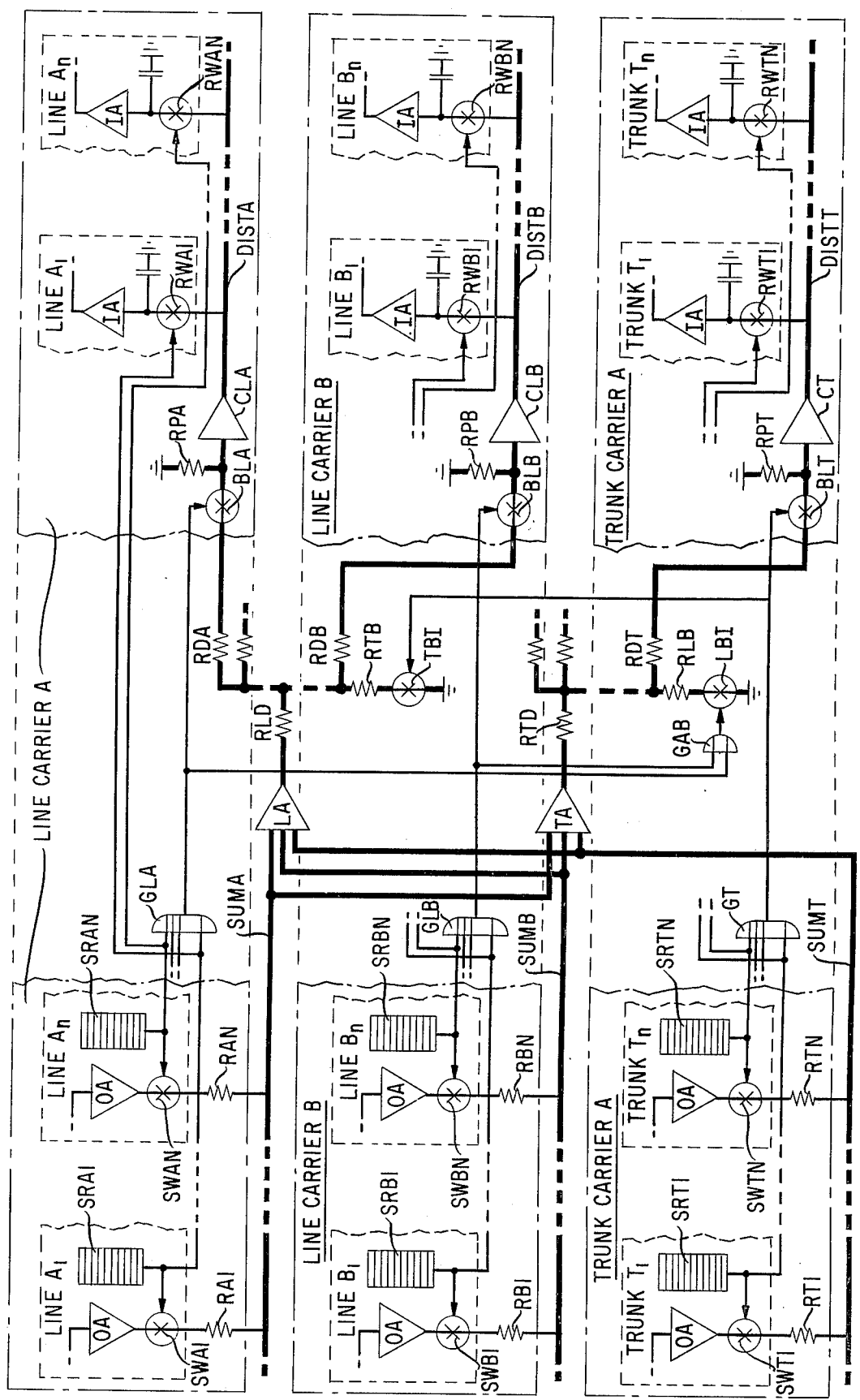

AUTOMATIC GAIN COMPENSATION IN TIME DIVISION SWITCHING SYSTEM

This invention relates to time division switching systems and more particularly to such systems, particularly private branch exchanges where there may be a high incidence of calls between stations connected to a common switching bus.

Prior art time division switching systems have employed several different types of information transfer. In one arrangement such as that disclosed in W. D. Lewis U.S. Pat. No. 2,936,337 issued May 10, 1960 a sampling capacitor and a low pass filter are used together with an inductor. The inductor is in series with the gate respective to each line circuit and between the capacitor and the gate. The gate connects the line to a common bus during an assigned time slot. When two line gates are operated, the two pairs of capacitor-inductor configurations form a resonant circuit for transmitting speech samples. The foregoing configuration is known as the resonant transfer arrangement.

In another type of time division system known as the active energy transfer type, the outgoing signal from one of a plurality of line or trunk port circuits is coupled to a first time division bus during a selected time slot, and is applied to an inter-bus or summing amplifier. The amplifier couples the signal to a second time division bus in the same time slot. Each line and trunk port circuit has a time division hybrid connected to the pair of time division buses by two gate switches. The hybrid in each line or trunk port circuit subtracts its own outgoing signal from the incoming signal obtained from the second time division bus and passes on the difference signal to its respective communications path. It is a characteristic of circuits of this type that each port circuit has two time division switches that are nevertheless operated simultaneously, a respective one of the time division switches connecting the hybrid to an associated one of the time division buses. Examples of the active energy type of time division communications switching are contained in U.S. Pat. No. 3,761,624 issued to T. G. Lewis and P. A. Vachon on Sept. 25, 1973, and U.S. Pat. No. 3,796,833 issued to T. G. Lewis and J. F. O'Neill on March 12, 1974.

Both port switches in the active energy type of time division switching system must be simultaneously operated because telephone systems, as opposed to some kinds of radio relay systems, do not operate in the push-to-talk mode. It is, therefore, desired that both parties in a communications connection be allowed to talk to each other at precisely the same instant of time even though one cannot do so as intelligently as one could if one listened whenever the other spoke. Since people seem naturally inclined to talk simultaneously and to listen selectively, if at all, the telephone system over which such "conversation" takes place should offer about the same opportunities for simultaneous talking as is offered by the free air in face-to-face conversations.

In the first of the above-mentioned time division systems, no problem is encountered because the respective sampling capacitor in each port circuit has both speech samples superimposed on it. In active-energy transfer time division systems of the second type which employ a single summing and distribution bus pair to which all the lines and trunks are connected, no problems have been observed in the "simultaneous talking" situation. However, in large systems of this type it becomes necessary to employ more than one summing and distribution bus pair. This dictates that on some calls both the calling and called port circuits will be served by the same bus pair but that on other calls the summing bus of one bus pair will be employed with the distribution bus of another bus pair. When the two port circuits served by such a time division network are both permitted to talk during the identical portion of a single time slot, the respective coupling resistor that connects each port circuit output to the summing bus may appear as a diversionary load to the other port circuit.

The problem is not apparent in very small systems such as that disclosed in the Medill-O'Neill U.S. Pat. No. 3,789,152 issued Jan. 29, 1974, in which all the lines and trunks are connected to the same summing and distribution buses. This is true because the attenuation that is introduced by the "second" summing resistor is always present and is compensated for in the common summing amplifier. In larger systems, however, where different groups of lines are served by different pairs of summing and distributing buses and where a group of trunks may be served by a further summing and distributing bus pair, occasions will arise when two port circuits served by the same bus pair will be in communication with each other and on other occasions port circuits served by different bus pairs, either for lines or between lines and trunks, will be in communication connection with each other. When different bus pairs are involved on the connection there will be less attenuation because of the additional isolation provided between different bus inputs to the common summing amplifier. Therefore, the greater gain that would be appropriate in the common summing amplifier for the case of a single bus pair path called will be inappropriate to the case of a different bus pair path call. It would, therefore, be appropriate, at least from the standpoint of offering utmost realism in conversation, to permit simultaneous speech without system-induced attenuation.

SUMMARY OF THE INVENTION

The foregoing and other objects and features of my invention are achieved in one illustrative embodiment wherein communication may take place among port circuits served by the same or by different bus pairs.

Whenever a call is made between port circuits served by the same or by different bus pairs, a compensating amplifier having an input attenuation pad is switched into the distribution bus to augment the gain provided by the prior art summing amplifier. When the call involves a communications path between port circuits served by the same bus pair, an attenuation is introduced because of the shunting effect that one port's output summing resistor exerts on the port's output to the summing bus. In accordance with my invention this attenuation is offset by the compensating amplifier. When the call involves a communications path between port circuits served by different bus pairs but involving the same summing amplifier, a compensating amplifier is inserted in series with each distribution bus of the different bus pairs. However, each compensating amplifier's input attenuation pad is in shunt with the output of the common summing amplifier driving both distribution buses and the input pads thereby offset the gain of the respective compensating amplifier. In this way no special control of compensator amplifier switching is required, the compensating amplifier may be switched-in when any line port becomes busy and adds additional gain when circuits on the same bus pair are involved in a call. When two different distribution buses are involved in a call the two compensating amplifiers are switched-in but the input attenuation pads of the compensating amplifiers shunt the summing amplifier output and thus reduce the input signal to the compensating amplifiers.

When the communications path involves not only different bus pairs but port circuits of different types, e.g., a trunk port and a line port, two summing amplifiers are employed, one driving the line port distributing bus and one driving the trunk port distributing bus. Because of the isolation between the outputs of the summing amplifiers the attenuation pads of the compensating amplifiers no longer effectively shunt each other. Accordingly, under these circumstances, an additional attenuation pad is inserted across the output of the summing amplifier serving each type of port circuit, i.e., across the output of the line port summing amplifier and across the output of the trunk port summing amplifier. This reduces the gain to normal levels.

DESCRIPTION OF THE DRAWING

The foregoing and other objects and features of my invention may become more apparent from the following detailed description when read together with the drawing, the single figure of which shows an illustrative embodiment of my loss equalization system.

DETAILED DESCRIPTION

The drawing shows a time division switching system involving three summing buses SUMA, SUMB, and SUMT, three distribution buses DISTA, DISTB, and DISTT, and two summing amplifiers LA and TA. Summing amplifier LA amplifies the time slot sample appearing on any of the aforementioned summing buses and delivers the signal to the two line port distributing buses DISTA and DISTB. Summing amplifier TA amplifies the time slot sample appearing on any of the summing buses and delivers the signal to the trunk port distributing bus DISTT.

The port circuits and the respective carriers on which the port circuits are located have been shown with the sending ends of the line port circuits at the left and the receiving ends of the line port circuits at the right to better depict the direction of information flow. Let it be assumed that a time division switching connection is to be established between port circuits $A_1$ and $A_n$.

Each port circuit as disclosed in the above-mentioned Medill-O'Neill patent includes a pair of time slot switches for connecting the output and input amplifiers of the port circuit hybrid to the summing and distribution buses and a recirculating shift register containing a single "1" bit that identifies the time slot during which both time slot switches of the port circuit are to be operated. In line port $A_1$, for example, the output of shift register SRA1 controls sending switch SWA1 and receiving switch RWA1. Switch SWA1 connects the hybrid's output amplifier OA to summing bus SUMA and receiving switch RWA1 connects the hybrid's input amplifier IA to distribution bus DISTA. In line port $A_n$ shift register SRAN controls switches SWAN and RWAN in similar fashion.

When a communications connection is to be established between line port $A_1$ and the line port $A_n$, the common control, not shown, inserts a corresponding time slot identifying bit in each of shift registers SRA1 and SRAN. Let it be assumed that line $A_1$ is talking: the speech sample present at the output of hybrid amplifier OA when switch SWA1 is closed by shift register SRA1 is applied through line port summing resistor RA1 to summing bus SUMA. The line port summing amplifier LA amplifies the speech samples and, neglecting for the moment resistors RLD, RDA, switch BLA and compensating amplifier CLA, applies the amplified sample to distribution bus DISTA. The signal on bus DISTA is applied to line $A_n$'s input hybrid amplifier IA via time division switch RWAN which is closed at the same time as the sending time slot switch SWA1 of line $A_1$. Time slot switch RWA1 of line port $A_1$ is also closed at this time and the input amplifier IA of its hybrid receives the signal on distribution bus DISTA to enable the line $A_1$ hybrid to maintain its dynamic balance.

As has been mentioned above, during the time slot, not only is the receive switch of the listening party closed but the sending switch (in this case switch SWAN) of the party assumed to be listening is also closed. This closure permits the station user of line $A_n$ to send a speech sample to line $A_1$ if he so desires. In the most frequent situations, however, the station user associated with port $A_n$ will be listening to the speech from line $A_1$. Because, however, switch SWAN is closed at this time, the input summing resistor RAN for line $A_n$ is connected in series with output impedance of amplifier OA across bus SUMA. The output amplifier OA and summing resistor RAN apply an a.c. shunting path to ground (not shown) on bus SUMA thereby attenuating the net input deliverable to summing amplifier LA.

Now let it be assumed that a communications connection is to be established from line $A_1$ to line $B_n$. These two lines appear on different line carriers and are served by different bus pairs. As before, the common control will insert a time slot bit in corresponding stages of the shift registers SRA1 and SRBN of the two line ports. When output amplifier OA of the hybrid of line $A_1$ applies a speech sample to bus SUMA, the signal is not attenuated by the closure of switch SWBN and resistor RBN of line $B_n$ because switch SWBN and input summing resistor RBN are not connected to summing bus SUMA. Summing amplifier LA provides sufficient isolation between summing buses SUMA and SUMB that the simultaneous closures of switches SWA1 and SWBN have negligible effect on the signal applied by line $A_1$ to amplifier LA. Since the input to amplifier LA is higher in this case than when communication was between lines $A_1$ and $A_n$, amplifier LA applies a higher signal under these circumstances to bus DISTA.

In accordance with my invention, I have provided an arrangement for inserting a compensating amplifier, such as amplifier CLA, in series with the relevant distribution bus, such as bus DISTA whenever any of the line ports of a line carrier such as carrier A has an assigned time slot. In series between the output of summing amplifier LA and distributing bus DISTA, I place coupling resistors RLD and RDA together with coupling switch BLA and compensating amplifier CLA. When any of the line port shift registers of line carrier A delivers a time slot bit at its output, in addition to operating the send and receive switches of its port circuit, an enabling time slot signal will be delivered through OR gate GLA to switch BLA. Switch BLA when so enabled connects compensating amplifier CLA in series between the output of summing amplifier LA and distribution bus DISTA. The gain of amplifier CLA is chosen to exactly offset the shunting attenuation effect due to the input summing resistor of the listening line. Accordingly, when a communications connection is extended between line ports served by the same bus pair, the switching-in of the compensating amplifier offsets the attenuating effect that one port circuit's input summing resistor has on the sampled output of the other circuit.

When a connection is established between ports served by different bus pairs, but involving the same summing amplifier, operations proceed as described above except that when the time slot arrives at the output of the port circuit associated with the other bus pair, e.g., in the case described above when shift register SRBN activates switches SWBN and RWBN, OR gate GLB will be activated. The activation of OR gate GLB will cause switch BLB to be operated thereby connecting compensating amplifier CLB in series between the output of summing amplifier LA and distribution bus DISTB. Associated with the input of compensating amplifier CLA, there is an input attenuating pad resistor RPA and, similarly, associated with the input of compensating amplifier CLB, there is an input attenuating pad resistor RPB. With the closure of switches BLA and BLB resistors RPA and RPB are both effectively placed in shunt across the output of the common line summing amplifier LA. The shunt connection attenuates the net input signal available to the respective distributing bus compensating amplifiers CLA and CLB. Thus, in accordance with my invention when communication is between port circuits served by different bus pairs but involving the same summing amplifier, the insertion of the compensating amplifier in series with each distributing bus is offset by the insertion of a shunting pad to ground.

From the foregoing it is seen that compensating amplifier CLA increases the signal on bus DISTA when circuit of only line carrier A are involved in the connection. When circuits involving both line carriers A and B are involved on the connection, the input to summing amplifier LA is greater because input summing resistor RBN does not shunt the input from line $A_1$. To offset the increased signal available at the output of summing amplifier LA under these circumstances, input pad resistors RPA and RPB are automatically connected in shunt with the output of summing amplifier LA. In accordance with my invention therefore, the same net amplitude signal will be delivered on distribution bus DISTA and DISTB whether the connection involved the other companion summing bus of the same pair or of the other bus pair.

The illustrative embodiment of my invention has thus far been described for the case only when port circuits of the same type were involved in the connection, i.e., for the case where the port circuits involved the use of the same common summing amplifier, LA. When the communication connection involves port circuits of different types, two different summing amplifiers such as summing amplifier LA serving the line ports and summing amplifier TA serving the trunk ports are employed. The use of a second summing amplifier means that the output summing resistors of the listening port circuit will not shunt the output signal of the talking port circuit. In addition, however, the input attenuating pad resistor associated with the compensating amplifier will not shunt the output of the summing amplifier and the gain will be too high. To compensate for the additional gain under these circumstances I provide for the selective insertion of an additional shunting resistor.

For example, let it be assumed that a communications path connection is established between line $A_1$ and trunk $T_n$. When the time slot arrives at the output of shift register SRA1 of line port $A_1$ OR gate GLA is enabled as before. The enabling of OR gate GLA in addition to enabling switch BLA of distributing bus DISTA, also enables switch LBI via OR gate GAB. Switch LBI inserts shunting resistor RLB across the output of the trunk summing amplifier TA. When the time slot bit arrives at the output of shift register SRTN, gate GT is enabled and in addition to enabling switch BLT of distributing bus DISTT, also enables switch TBI. The enabling of switch TBI inserts shunting resistor RTB across the output of line summing amplifier LA. The output speech sample from line $A_1$ is applied through resistor RA1 to bus SUMA and, amplified by trunk summing amplifier TA, is applied through switch BLT and compensating amplifier CT to distributing bus DISTT and trunk circuit TN. Likewise, the time slot sample from trunk TN is applied through summing resistor RTN to summing bus SUMT and, amplified by line summing amplifier LA is applied through switch BLA and compensating amplfier CLA to distributing bus DISTA and line port circuit $A_1$.

Accordingly, I have shown an arrangement where the attenuation introduced by the shunting effect of the input summing resistor of the port circuit served by the same bus pair may be offset by the use of a compensating amplifier and where the effect of the compensating amplifier may be cancelled, when different bus pairs are involved, by the shunting effect of the compensating amplifiers' input attenuation pad. Further, I have shown an arrangement for providing an additional shunting pad to cancel the effect of the compensating amplifier when connections are made between bus pairs serving port circuits of different types. Further and other modifications may be conceived by those skilled in the art without departing from the spirit and scope of my invention.

What is claimed is:

1. In a time division switching system in which port circuits served by different summing buses as well as port circuits served by the same summing bus may be interconnected by circuitry providing a specified amount of gain comprising
    amplifier means for increasing the gain to port circuits when the port circuits involved on a connection are served by the same summing bus, and
    switchable attenuation means for decreasing the gain when the port circuits involved on the connection are served by different summing buses.

2. In a time division switching system according to claim 1, wherein said system further includes distribution buses connected to groups of said port circuits, and a common summing amplifier for delivering time slot samples from said summing buses to said distribution buses, the combination wherein said amplifier means for increasing said gain is connected in circuit with each of said distribution buses.

3. A time division switching system according to claim 2 wherein said switchable attenuation means are connectable to shunt the output of said summing amplifier and the input of said amplifier means for decreasing said gain.

4. In a time division switching system in which any of a plurality of different port circuits may be served by the same or by different summing and distribution buses on particular calls, an arrangement for selectively compensating for the differences in attenuation attributable to the differences in switching configuration, comprising
- a respective compensating amplifier for each of said distributing buses,
- input attenuation means respective to each of said compensating amplifiers,
- means for switching-in one of said amplifiers and its corresponding attenuation means on calls involving a summing and a distribution bus serving the same group of said port circuits in which the calling and called port circuits are involved, and
- means for selectively switching-in another of said amplifiers respective to the other of said distribution buses and its corresponding attenuation means on calls involving port circuits served by different summing and distribution buses.

5. In a time division switching system in which each of a plurality of groups of line circuits is served by a respective summing and distribution bus pair and in which a group of trunk circuits is served by a corresponding summing and distribution bus pair, the combination comprising
- a common line summing amplifier for connecting all of said summing buses to said distribution bus for said line circuits,
- a common trunk summing amplifier for connecting all of said summing buses to said distribution buses serving said trunk circuits,
- attenuation means respective to each of said common line and trunk summing amplifiers,
- a respective compensating amplifier for each of said distribution buses,
- means for selectively switching-in said attenuation means respective to said line summing amplifier on calls involving any of said trunks and one of said lines, and
- means for switching-in said attenuation means respective to said common trunk summing amplifier only on calls involving any of said lines and one of said trunks.

6. In a time division switching system in which each of a plurality of groups of port circuits of a particular kind is served by a respective summing and distribution bus pair, each such port circuit of a group being connected to the summing bus serving that group by a respective sending time slot switch and summing impedance; in which the summing buses for the groups of port circuits of the same type are served by a common summing amplifier, each of said port circuits also including a receiving time slot switch connected to the corresponding distribution bus of the bus pair to which its sending time slot switch is connected, the combination comprising
- compensating amplifier means in circuit between the output of said common summing amplifier and each said distribution bus, and
- respective attenuation means in shunt with the output of said common summing amplifier and the input of each of said compensating amplifier means,
- said compensating amplifier means having a gain to offset the input attenuation to said common summing amplifier when two of said input summing impedances are connected during a common time slot to the same summing bus, and said respective shunt-connected attenuation means having a value to offset said compensating amplifier gain when port circuit receiving time slot switches connected to two different distribution buses are activated during the same time slot.

7. A time division switching system comprising first and second groups of port circuits,
- first and second summing and distributing bus means for said first and second groups of port circuits, respectively,
- a common summing amplifier connected to both said summing bus means,
- a common resistor connected in series with the output of said summing amplifier,
- a first and a second compensating amplifier,
- first and second attenuating means respectively shunting said first and second compensating amplifier inputs to ground,
- first and second switch means respectively connecting said first and second compensating amplifiers to said common resistor, and
- first and second gate means responsive to said port circuits of said first and second groups for controlling said first and second means, respectively.

8. A time division switching system in accordance with claim 7 further comprising a plurality of trunk circuits and a summing and a distributing bus therefor,
- third attenuating means and third switch means connected between said common resistor and ground, and
- third gate means responsive to any of said trunk circuits for controlling said third switch means.

* * * * *